United States Patent
Gao et al.

(10) Patent No.: US 10,324,810 B2
(45) Date of Patent: Jun. 18, 2019

(54) METHOD AND APPARATUS FOR REDUNDANT ARRAY OF INDEPENDENT DISKS WITH RAID METADATA AND SUB-RAID METADATA STORED USING DIFFERENT RAID ALGORITHMS

(71) Applicant: EMC IP Holding Company LLC, Hopkinton, MA (US)

(72) Inventors: Hongpo Gao, Beijing (CN); Jian Gao, Beijing (CN); Huibing Xiao, Beijing (CN); Jibing Dong, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 160 days.

(21) Appl. No.: 15/272,693

(22) Filed: Sep. 22, 2016

(65) Prior Publication Data
US 2017/0091052 A1   Mar. 30, 2017

(30) Foreign Application Priority Data
Sep. 25, 2015   (CN) .......................... 2015 1 0624888

(51) Int. Cl.
*G06F 11/10* (2006.01)
*G06F 11/16* (2006.01)
*G06F 11/20* (2006.01)

(52) U.S. Cl.
CPC ...... *G06F 11/1662* (2013.01); *G06F 11/1076* (2013.01); *G06F 11/2053* (2013.01); *G06F 11/2056* (2013.01); *G06F 2201/805* (2013.01); *G06F 2201/82* (2013.01)

(58) Field of Classification Search
CPC ............. G06F 11/1092; G06F 11/1076; G06F 11/2053; G06F 11/2094; G06F 11/2056; G06F 11/2058
See application file for complete search history.

(56) References Cited

U.S. PATENT DOCUMENTS

| | | | |
|---|---|---|---|
| 7,574,623 B1* | 8/2009 | Goel | G06F 11/008 714/47.2 |
| 7,587,630 B1* | 9/2009 | Cassell | G06F 11/1088 714/47.3 |
| 2004/0153618 A1* | 8/2004 | Wang | G06F 11/1096 711/170 |
| 2005/0267916 A1* | 12/2005 | Tone | G06F 11/2038 |
| 2010/0205372 A1* | 8/2010 | Daikokuya | G06F 3/0607 711/114 |
| 2013/0047028 A1* | 2/2013 | Daikokuya | G06F 11/0727 714/6.3 |
| 2013/0054913 A1* | 2/2013 | Maeda | G06F 9/50 711/162 |
| 2014/0281689 A1* | 9/2014 | Fischer | G06F 11/1092 714/6.22 |
| 2017/0185312 A1* | 6/2017 | Smith | G06F 3/0608 |

* cited by examiner

*Primary Examiner* — Joseph O Schell
(74) *Attorney, Agent, or Firm* — Krishnendu Gupta; Lesley Leonessa

(57) ABSTRACT

The present disclosure provides a method and apparatus for a redundant array of independent disks, RAID. The method includes: dividing the RAID into a plurality of sub-RAIDs; generating sub-RAID metadata corresponding to each of the sub-RAIDs; and in response to a disk in the RAID being replaced, rebuilding data in a corresponding sub-RAID based on the sub-RAID metadata. The present disclosure further provides a computer readable storage medium and a storage system.

20 Claims, 11 Drawing Sheets

METHOD AND APPARATUS FOR REDUNDANT ARRAY OF INDEPENDENT DISKS WITH RAID METADATA AND SUB-RAID METADATA STORED USING DIFFERENT RAID ALGORITHMS

RELATED APPLICATION

This application claim priority from Chinese Patent Application Number CN201510624888.0, filed on Sep. 25, 2015 at the State Intellectual Property Office, China, titled "METHOD AND APPARATUS FOR REDUNDANT ARRAY OF INDEPENDENT DISKS," the contents of which is herein incorporated by reference in its entirety

FIELD

The present disclosure generally relates to a storage system and method, and more particularly relates to a method and apparatus for redundant array of independent disks, RAID.

BACKGROUND

Among disks that may constitute a redundant array of independent disks RAID, several kinds of disks have poor performance but a large capacity, such as NL-SAS disk. As a result, when a RAID including NL-SAS disks is degraded, rebuilding for a new disk will last for a rather long time, or even days. In this situation, the RAID stays in a risky state for a too long term (i.e., potential data unavailability/data loss), because any other disk failure from this RAID will cause damage of the entire RAID (in the case of RAID-5 type). All data from this RAID will become unavailable. In a word, when the RAID is in a degraded state, clients will frequently encounter a data unavailable risk.

However, RAID has been rebuilt for a long term since failure of a first disk, and data in some RAID stripes have been recovered. Therefore, in case that one disk in the RAID has been rebuilt for a while and then a further disk is damaged, there still exists a possibility of recovering some data.

SUMMARY

In view of the problems above in the prior art, an objective of embodiments of the present disclosure is providing a method and apparatus for a redundant array of independent disks, RAID, so as to solve the above and other issues in the prior art. Specifically, the embodiments of the present disclosure will provide a novel method and corresponding apparatus for recovering data from a damaged RAID (e.g., in the circumstance described above).

According to a first aspect of the present disclosure, there is provided a method for a redundant array of independent disks, RAID. The method includes: dividing the RAID into a plurality of sub-RAIDs; generating sub-RAID metadata corresponding to each of the sub-RAIDs; and in response to a disk in the RAID being replaced, rebuilding data in a corresponding sub-RAID based on the sub-RAID metadata.

In some embodiments, the sub-RAID metadata may include a rebuilding state, and the method may include: in response to a disk in the RAID being replaced, setting the rebuilding state to indicate that the disk needs to be rebuilt; rebuilding the disk that needs to be rebuilt according to the indication of the rebuilding state; and in response to completing the rebuilding of the disk, setting the rebuilding state to indicate that the disk does not need to be rebuilt.

In some embodiments, each disk in the RAID may correspond to one bit of the rebuilding state, and the method may include: setting a bit of the rebuilding state corresponding to the disk to indicate whether the disk needs to be rebuilt.

In some embodiments, the sub-RAID metadata may include a rebuilding priority, and the method may include: rebuilding data in the plurality of sub-RAIDs according to a priority order.

In some embodiments, the method may further include: generating RAID metadata corresponding to the RAID.

In some embodiments, the RAID metadata may include a disk signature, the disk signature including a disk identifier uniquely identifying a disk and a RAID identifier uniquely identifying a RAID.

In some embodiments, the method may further include: in response to a disk in the RAID being replaced, determining whether the disk signature of a new disk exists in the RAID metadata; if it is determined that the disk signature of the new disk exists in the RAID metadata, directly connecting the new disk into the RAID; and if it is determined that the disk signature of the new disk does not exist in the RAID metadata, updating the disk signature of the new disk with the RAID identifier of the RAID, and storing the updated disk signature in the RAID metadata.

In some embodiments, the RAID metadata may include the number of sub-RAIDs that need to be rebuilt and a list of the sub-RAIDs that need to be rebuilt, and the method may further include: in response to completing the rebuilding of data in a sub-RAID, correspondingly updating the number of sub-RAIDs that need to be rebuilt and the list of the sub-RAIDs that need to be rebuilt.

In some embodiments, the method may further include: when the rebuilding of data in all the sub-RAIDs has not been completed and a further disk in the RAID becomes unavailable, determining whether the rebuilding state in each sub-RAID metadata indicates existence of a disk that needs to be rebuilt; if the rebuilding state in the sub-RAID metadata indicates that no disk needs to be rebuilt, recovering data in the sub-RAID; and if the rebuilding state in the sub-RAID metadata indicates existence of a disk that needs to be rebuilt, labeling data in the sub-RAID as being lost.

In some embodiments, the sub-RAID metadata and the RAID metadata may be stored in storage external to the RAID.

According to a second aspect of the present disclosure, there is provided an apparatus for a redundant array of independent disks, RAID. The apparatus includes: a dividing unit configured to divide the RAID into a plurality of sub-RAIDs; a generating unit configured to generate sub-RAID metadata corresponding to each of the sub-RAIDs; and a rebuilding unit configured to, in response to a disk in the RAID being replaced, rebuild data in a corresponding sub-RAID based on the sub-RAID metadata.

In some embodiments, the sub-RAID metadata may include a rebuilding state, and the apparatus may include: a setting unit configured to, in response to a disk in the RAID being replaced, set the rebuilding state to indicate that the disk needs to be rebuilt; the rebuilding unit is further configured to rebuild the disk that needs to be rebuilt according to the indication of the rebuilding state; and the setting unit is further configured to, in response to completing the rebuilding of the disk, set the rebuilding state to indicate that the disk does not need to be rebuilt.

In some embodiments, each disk in the RAID may correspond to one bit of the rebuilding state, and the setting unit may further be configured to, set a bit of the rebuilding state corresponding to the disk to indicate whether the disk needs to be rebuilt.

In some embodiments, the sub-RAID metadata may include a rebuilding priority, and the rebuilding unit may further be configured to rebuild data in the plurality of sub-RAIDs according to a priority order.

In some embodiments, the generating unit may be further configured to generate RAID metadata corresponding to the RAID.

In some embodiments, the RAID metadata may include a disk signature, the disk signature including a disk identifier uniquely identifying a disk and a RAID identifier uniquely identifying a RAID.

In some embodiments, the apparatus may further include: a determining unit configured to, in response to a disk in the RAID being replaced, determine whether the disk signature of a new disk exists in the RAID metadata; a connecting unit configured to, if it is determined that the disk signature of the new disk exists in the RAID metadata, directly connect the new disk into the RAID; and an updating unit configured to, if it is determined that the disk signature of the new disk does not exist in the RAID metadata, update the disk signature of the new disk with the RAID identifier of the RAID, and store the updated disk signature in the RAID metadata.

In some embodiments, the RAID metadata may include the number of sub-RAIDs that need to be rebuilt and a list of the sub-RAIDs that need to be rebuilt, and the updating unit may further be configured to, in response to completing the rebuilding of data in a sub-RAID, correspondingly update the number of sub-RAIDs that need to be rebuilt and the list of the sub-RAIDs that need to be rebuilt.

In some embodiments, the determining unit may further be configured to, when the rebuilding of data in all the sub-RAIDs has not been completed and a further disk in the RAID becomes unavailable, determine whether the rebuilding state in each sub-RAID metadata indicates existence of a disk that needs to be rebuilt; and the apparatus may further include: a recovering unit configured to, if the rebuilding state in the sub-RAID metadata indicates that no disk needs to be rebuilt, recover data in the sub-RAID; and a labeling unit configured to, if the rebuilding state in the sub-RAID metadata indicates existence of a disk that needs to be rebuilt, label data in the sub-RAID as being lost.

In some embodiments, the sub-RAID metadata and the RAID metadata may be stored in storage external to the RAID.

According to a third aspect of the present disclosure, there is provided a computer readable storage medium having computer readable program instructions stored thereon for performing a method of the first aspect.

According to a fourth aspect of the present disclosure, there is provided a storage system including an apparatus according to the second aspect of the present disclosure.

In the present disclosure, a plurality of aspects and a plurality of embodiments provide stripe mining for RAID, i.e., a novel method and apparatus for recovering data from a conventional damaged RAID. A plurality of aspects and a plurality of embodiments modify a RAID metadata structure including RAID metadata so as to restore part of a RAID in the case of RAID damage. This method may be referred to as stripe mining Compared to conventional RAIDs, the novel structure and novel method according to the embodiments of the present disclosure introduce the following advantages.

First, data may become more secure. Even if a RAID is damaged, part of data can be still recovered therefrom. Second, a flexible and prioritized data rebuilding is provided. The embodiments of the present disclosure do not have to sequentially initiate rebuilding like a normal RAID. Alternatively, the embodiments of the present disclosure can preferably initiate rebuilding to a certain part of a RAID, and can also select not to rebuild some areas and save rebuilding time. In addition, the embodiments of the present disclosure may adopt a RAID rebuilding calculation like existing RAID products. For example, 4+1 RAID 5 may have a dedicated calculation lib for rebuilding data in case that a disk in a RAID is damaged and an idle disk enters into the RAID.

BRIEF DESCRIPTION OF THE DRAWINGS

Through reading the detailed description below with reference to the accompanying drawings, the above and other objectives, features and advantages of the embodiments of the present disclosure will become easily understood. In the accompanying drawings, several embodiments of the present disclosure are illustrated in an exemplary and non-limiting manner, wherein.

DETAILED DESCRIPTION

Hereinafter, the principle and spirit of the present disclosure will be described with reference to several example embodiments as illustrated in the accompanying drawings. It should be understood that these specific embodiments are described only for enabling those skilled in the art to better understand and implement the present disclosure, not intended to limit the scope of the present disclosure in any manner.

Figure 1:
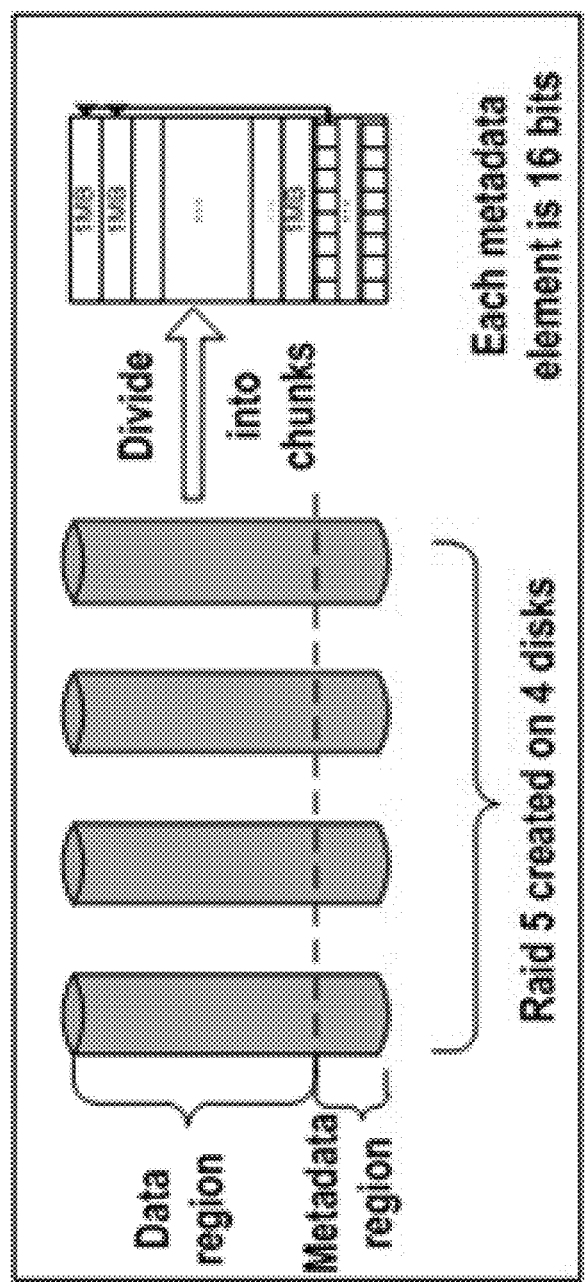
FIG. 1 schematically illustrates a layout of data and metadata of an example RAID.

FIG. 1 schematically illustrates a layout of data and metadata of an example RAID. As illustrated in FIG. 1, in products such as VNX2 by EMC, a user may create a redundant array of independent disks RAID on a plurality of disks. The disk space of a RAID may be partitioned into chunks, and the size of each chunk may be 1 megabyte. Further, a RAID may define metadata to describe a chunk state, such as information regarding need of rebuilding, and the metadata may be stored in an area at an end of each disk. The data region and the metadata region may use a same RAID geometry and algorithm 1 metadata element may describe a state of user data of 1 chunk.

When a disk in a RAID is removed or damaged, if an idle disk configured in the array exists, a new disk will be automatically swapped into the RAID to replace the failed disk. The RAID modifies metadata using rebuilding information to label the new disk as needing to be rebuilt. When a disk needs to be rebuilt, relevant bits will be labelled. After completion of the rebuilding, the RAID will clear its rebuilding information from the metadata and get out of a degradation state.

Figure 2:
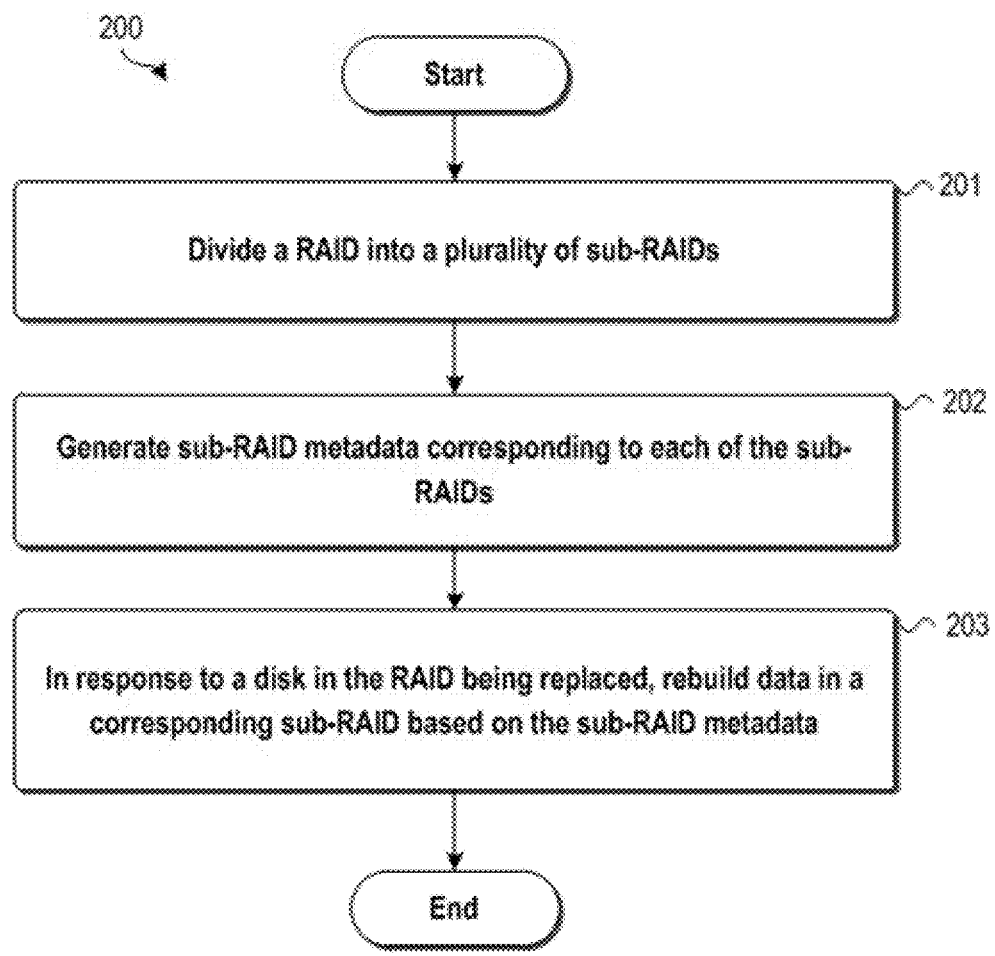
FIG. 2 schematically illustrates a method for RAID according to one embodiment of the present disclosure.

FIG. 2 schematically illustrates a method 200 for RAID according to one embodiment of the present disclosure. As illustrated in FIG. 2, the method 200 may enter step 201 after start. In step 201, a RAID may be divided into a plurality of sub-RAIDs. Next, the method 200 may proceed to step 202. In step 202, sub-RAID metadata corresponding to each of the sub-RAIDs may be generated.

Figure 3:
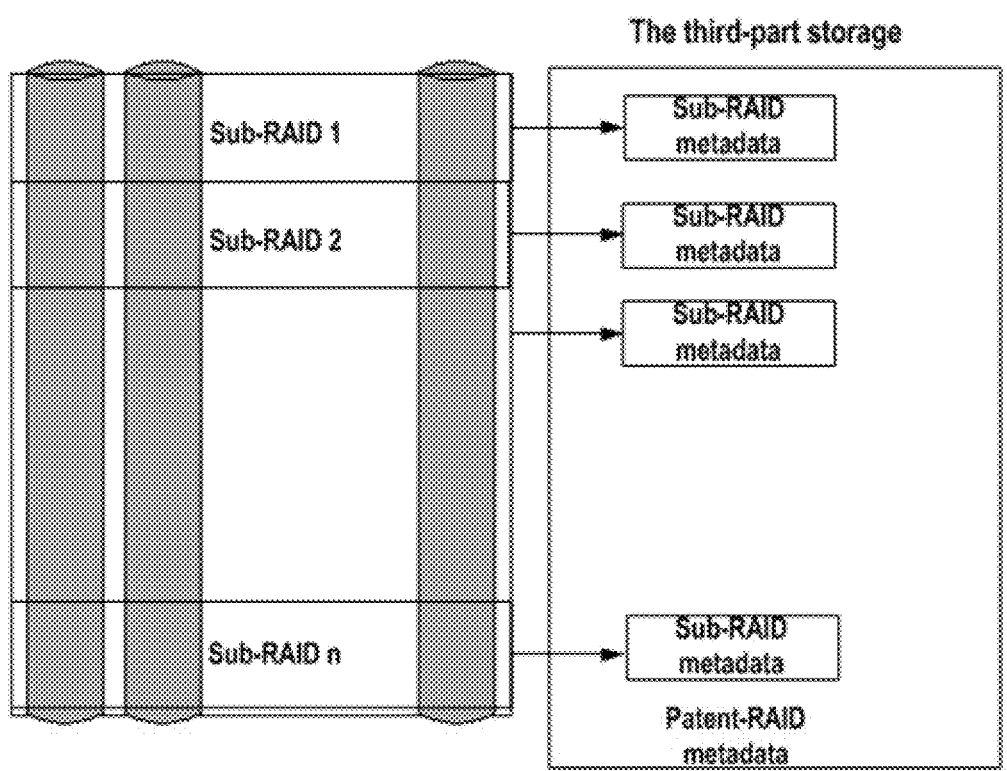
FIG. 3 schematically illustrates a sub-RAID and its metadata according to one embodiment of the present disclosure.

In the embodiments of the present disclosure, two levels of RAIDs may be defined: parent RAIDs and sub-RAIDs. In this regard, FIG. 3 schematically illustrates a sub-RAID and its metadata according to one embodiment of the present disclosure. As illustrated in FIG. 3, one RAID may be divided into a plurality of sub-RAIDs. This divided RAID may be referred to as a parent RAID, and the RAIDs resulting from the dividing may be referred to as sub-RAIDs.

According to some embodiments of the present disclosure, a parent RAID may include all RAID information, e.g., rebuilding checkpoints, rebuilding information for each chunk, disk information, etc. In contrast, a sub-RAID may include much less metadata to save storage. According to some embodiments of the present disclosure, methods of generating metadata for RAIDs, as known in the art, may be used to generate corresponding metadata for respective sub-RAIDs and parent RAID.

In addition, the size of each sub-RAID may depend on a specific implementation. For a larger size, less storage is needed to store sub-metadata. However, when the RAID is damaged, more data might be lost. According to some embodiments of the present disclosure, the sizes of sub-RAIDs may be identical or different. This may be selected by those skilled in the art according to specific technical environments and requirements.

According to some embodiments of the present disclosure, the sub-RAID metadata and parent RAID metadata cannot be stored in a same RAID disk using a same RAID algorithm In one embodiment, the sub-RAID metadata and the parent RAID metadata may be stored in disk space external to the RAID. For example, it may be stored in another three-way mirror RAID. This guarantees that no sub-metadata will be lost in the case of RAID damage.

Next, the method 200 may proceed to step 203. In step 203, in response to one disk being replaced, data in a corresponding sub-RAID may be rebuilt based on the sub-RAID metadata.

Those skilled in the art may understand, in the RAID, when one disk becomes unavailable due to damage, removal or other reasons, an idle disk may be used to replace this unavailable disk. When the idle disk enters into the RAID, the data stored in the replaced disk needs to be rebuilt in the newly joined disk, such that the newly joined disk can replace the previous disk.

Compared to that the newly joined disk needs to be rebuilt with respect to a complete RAID previously, because the RAID is divided into a plurality of sub-RAIDs, the embodiments according to the present disclosure can rebuild data in a corresponding sub-RAID based on the sub-RAID metadata with a sub-RAID as a unit. As mentioned above, when the rebuilding data with a complete RAID as a unit, if the rebuilding needs a longer time while a further disk at this point also becomes unavailable, all data in the previous disk will become unavailable because the data in the previously unavailable disk have not been completely rebuilt. In contrast, according to the embodiments of the present disclosure, because data rebuilding is performed with a sub-RAID as a unit, data in the already rebuilt sub-RAID may be recovered in this scenario. Hereinafter, FIG. 4 is referenced to specifically describe the definitions of sub-RAID metadata and parent RAID metadata according to the embodiments of the present disclosure.

Figure 4:
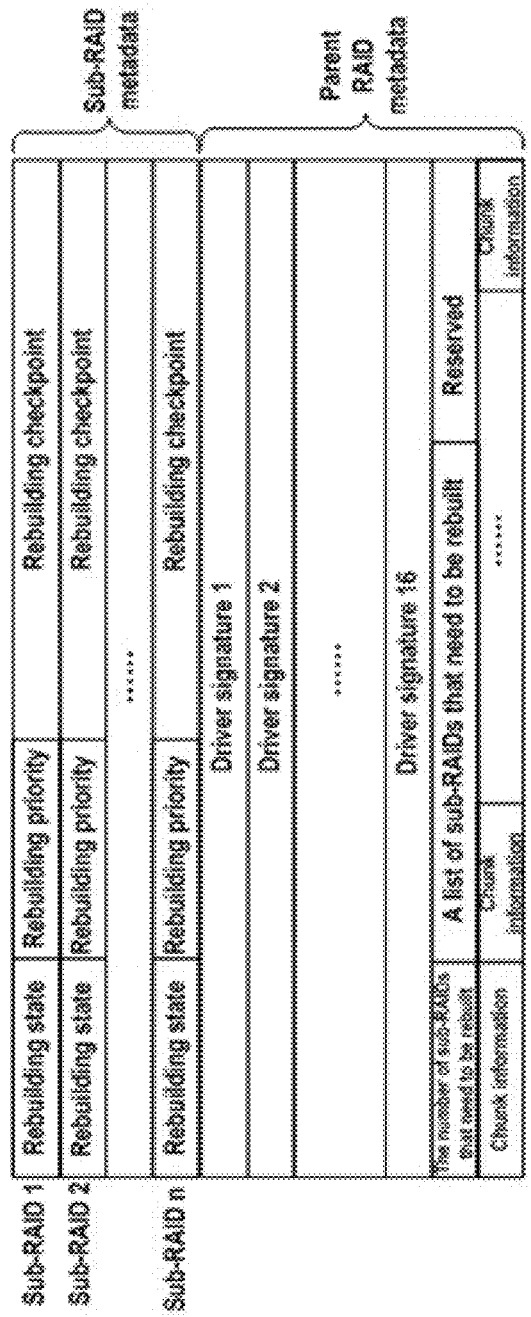
FIG. 4 schematically illustrates data structures of sub-RAID metadata and parent-RAID metadata according to one embodiment of the present disclosure.

FIG. 4 schematically illustrates data structures of sub-RAID metadata and parent RAID metadata according to one embodiment of the present disclosure. As illustrated in FIG. 4, non-paged (NP) metadata of the sub-RAID and the parent RAID are stored at other position than the current RAID. Both the sub-RAID and parent RAID have NP metadata information, and the sub/parent NP metadata structure may be defined as follows. Those skilled in the art should understand that FIG. 4 provides only definitions of a specific sub-RAID metadata and parent RAID metadata according to the embodiments of the present disclosure, and the scope of the present disclosure is not limited to the specific example.

According to some embodiments of the present disclosure, the sub-RAID metadata may include a 2-byte rebuilding state. Generally, a maximum number of disks in a RAID is 16, such that each bit in the 2-byte rebuilding state may indicate which disk needs to be rebuilt. As shown in FIG. 4, the sub-RAID metadata may also include a 2-byte rebuilding priority. A numeral of the rebuilding priority indicates a priority level for rebuilding. In one embodiment, a smaller numeral means a higher priority for rebuilding. Additionally, the sub-RAID metadata may also include an 8-byte rebuilding checkpoint, which records the current rebuilding position of the sub-RAID. In one embodiment, the rebuilding position may be represented by a logic block address LBA.

Correspondingly, according to some embodiments of the present disclosure, the method 200 may include: in response to a disk in the RAID being replaced, setting a rebuilding state to indicate that the disk needs to be rebuilt; rebuilding the disk according to an indication of the rebuilding state; and in response to completing the rebuilding of the disk, setting the rebuilding state to indicate that the disk does not need to be rebuilt. Those skilled in the art may understand, for a data rebuilding procedure for each sub-RAID, whether a disk needs to be rebuilt is determined by querying the rebuilding state; and each time when the rebuilding of a disk is completed, the rebuilding state of the disk is set as needing not to be rebuilt.

According to some embodiments of the present disclosure, as the example described with reference to FIG. 4, each disk in the RAID may correspond to one bit of the rebuilding state. In this case, the step of setting a rebuilding state in the method 200 may include: setting a bit of the rebuilding state corresponding to the disk to indicate whether the disk needs to be rebuilt.

According to some embodiments of the present disclosure, in case that the sub-RAID metadata includes a rebuilding priority, the method 200 may include: rebuilding data in a plurality of sub-RAIDs according a priority order.

When one disk in the RAID is replaced, if the new disk swapped in is a disk that was previously connected to the RAID and the disk is not connected to another RAID thereafter, then the information about the disk which the RAID knew previously is still available. In this case, the disk may be directly connected to the RAID, without a need of making other settings. If the disk was not previously connected to the RAID or the disk is also connected to another RAID after being connected to the RAID, it is needed to perform necessary settings to the disk before being connected to the RAID to work.

In this regard, according to some embodiments of the present disclosure, the parent RAID metadata may include a disk signature. The disk signature may include a disk identifier that uniquely identifies the disk and a RAID identifier that uniquely identifies the RAID. Therefore, a disk signature may be used to identify each disk belonging to a RAID. Specifically, as depicted in FIG. 4, the parent RAID metadata may include a disk signature which may be 16×16 bytes. This is because 16 bytes may possibly be needed for each disk and to support a maximal 16 disks for each RAID. In some embodiments, the disk signature may also be written into a certain area in each disk, which area cannot be accessed by the RAID.

Figure 5:
FIG. 5 schematically illustrates a definition of a disk signature according to one embodiment of the present disclosure.

FIG. 5 schematically illustrates a definition of a disk signature according to one embodiment of the present disclosure. As illustrated in FIG. 5, according to some embodiments of the present disclosure, the disk signature is unique to each disk. The disk signature may include a worldwide name WWN seed and a disk serial number. The WWN seed and the disk serial number may be 8 bytes, respectively. Each RAID has a unique WWN seed, such that the WWN seed may be used to track into which RAID a disk is inserted. The disk serial number is assigned to a disk by a disk manufacturer. The disk serial number is used to identify the disk, such that the serial number can indicate which disk is inserted into the RAID.

When a disk is connected to the RAID, software will scan a relevant database to check whether a disk signature of the disk has been existent in a relevant system of the RAID. In the case of existence, which means that the disk is not a new disk, then the disk may be connected in default. If the disk signature does not exist, it is needed to label the disk signature into the disk.

Figure 6:
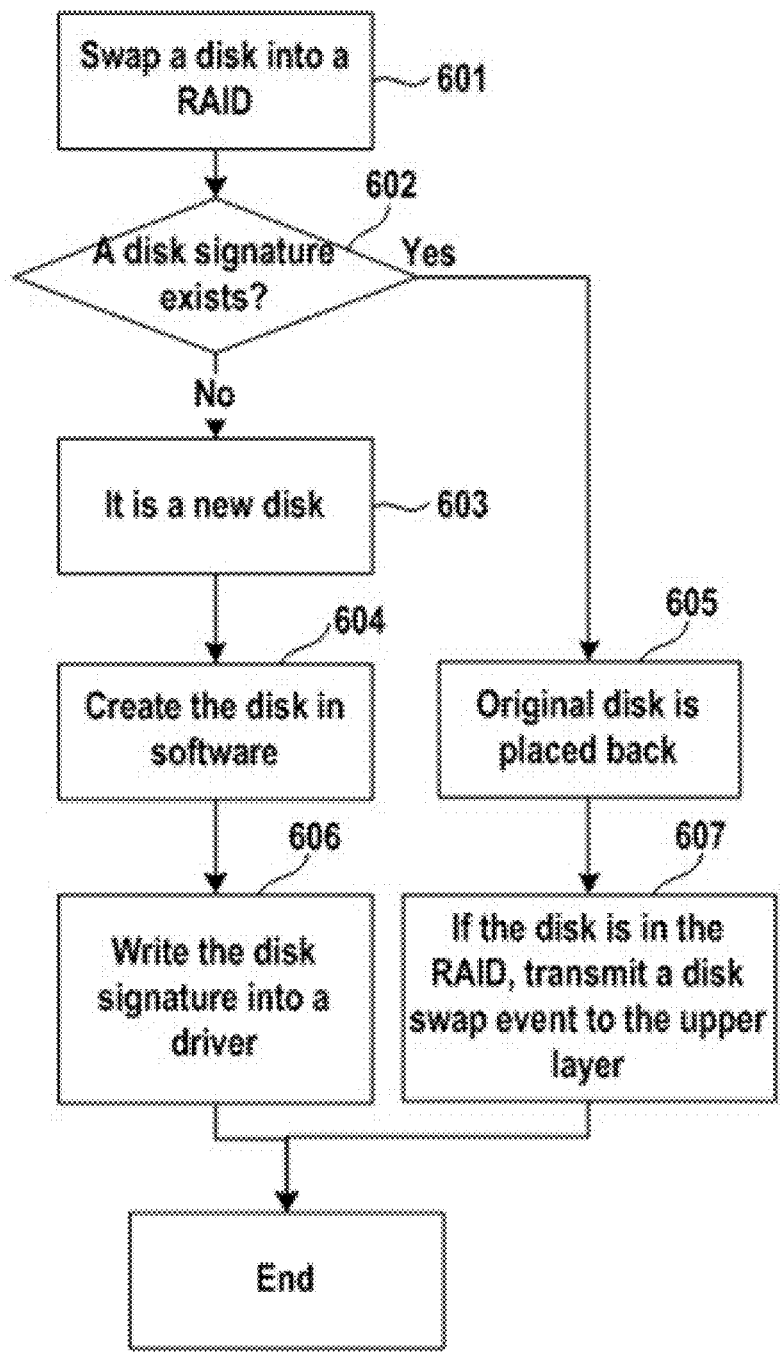
FIG. 6 schematically illustrates a flow diagram of disk signature processing according to one embodiment of the present disclosure.

FIG. 6 schematically illustrates a flow diagram of disk signature processing according to one embodiment of the present disclosure. As shown in FIG. 6, in step 601, a disk may be swapped into a RAID. Next, in step 602, it may be determined whether a disk signature of the disk exists. In the case of existence, in step 605, it may be determined that the disk is an original disk placed back into the RAID. In this case, in step 607, an event of swapping the disk into the RAID may be transmitted to an upper layer. On the other hand, if it is determined in step 602 that a disk signature of the disk does not exist, in step 602, it may be determined that the disk is a new disk that was not previously connected in the RAID or connected to another RAID after being connected to the RAID. Accordingly, in step 604, a corresponding setup of the disk may be performed in the software of the RAID. Next, in step 606, an updated disk signature of the disk may be written into the disk. After step 606 or 607 is completed, the flow in FIG. 6 may end.

Correspondingly, according to some embodiments of the present disclosure, the method 200 may further include: in response to a disk in the RAID being replaced, determining whether a disk signature of the new disk exists in the RAID metadata; if it is determined that the disk signature of the new disk exists in the RAID metadata, directly connecting the new disk into the RAID; and if it is determined that the disk signature of the new disk does not exist in the RAID metadata, updating the disk signature of the new disk using the RAID identifier of the RAID, and storing the updated disk signature in the RAID metadata. In this way, each time when a disk is swapped into the RAID, it may be determined whether the disk may be directly connected to the RAID without setting by looking up the disk signature.

As depicted in FIG. 4, in some embodiments, the parent RAID metadata may include the number of sub-RAIDs that need to be rebuilt, which may be 2 bytes. It records the quantity of sub-RAIDs that need to be rebuilt. Additionally, the parent RAID metadata may also include a list of sub-RAIDs that need to be rebuilt. The parent RAID metadata may also include a plurality of chunk information of 2 bytes, and they record which chunk in the disk needs to be rebuilt.

Specifically, when a disk in a RAID is invalid or removed, the RAID will be degraded. At this time, it is needed to set the rebuilding state of the metadata of the sub-RAID such that all sub-RAIDs are labelled as needing to be rebuilt. Additionally, a list of sub-RAIDs that need to be rebuilt in the parent RAID metadata and the number of sub-RAIDs to be rebuilt are also updated. When a disk in the RAID is invalid or removed, an idle disk will be swapped into the RAID. When the disk is swapped into the RAID, it is needed to label on the parent RAID metadata that the RAID needs to be rebuilt.

Upon swapping into a new disk, the following steps may be adopted. First, a disk signature recorded in the parent RAID metadata may be updated. After it is updated, the disk may become a part of the RAID. Second, all chunk information may be labelled as needing to be rebuilt. Finally, rebuilding labelling processing is ended, and later, the RAID will rebuild the data to the new disk on a background rebuilding service.

Figure 7:
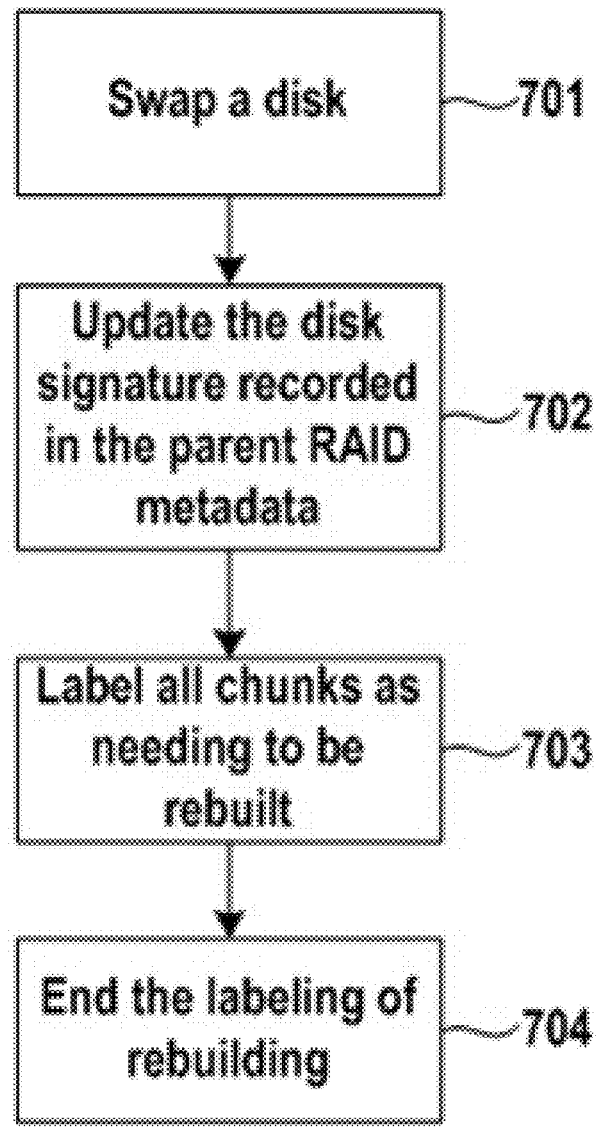
FIG. 7 schematically illustrates a flow diagram for labelling a new disk that needs to be rebuilt according to one embodiment of the present disclosure.

FIG. 7 schematically illustrates a flow diagram for labelling a new disk that needs to be rebuilt according to one embodiment of the present disclosure. As illustrated in FIG. 7, in step 701, a disk may be swapped into a RAID. Next, in step 702, after updating a disk signature of the disk, the updated disk signature may be recorded in the parent RAID metadata, i.e., updating the disk signature recorded in the parent RAID metadata. Next, in step 703, all chunks in the disk may be labelled as needing to be rebuilt. This may be implemented by setting corresponding parameters in the corresponding parent RAID metadata and sub-RAID metadata. Finally, in step 704, rebuilding labelling for the disk may be completed.

Correspondingly, according to some embodiments of the present disclosure, the method 200 may further include: in response to completing the rebuilding of data in a sub-RAID, the number of sub-RAIDs that need to be rebuilt and a list of sub-RAIDs that need to be rebuilt are correspondingly updated.

According to some embodiments of the present disclosure, when a RAID is rebuilding and a further disk therein is failed, a conventional RAID will be damaged due to double disk failure. However, by virtue of the design of sub-RAID metadata, the embodiments of the present disclosure can recover part of data using a corresponding process.

In this regard, the method 200 may further include: when the rebuilding of data in all sub-RAIDs has not been completed yet and a further disk in the RAID becomes unavailable, it is determined whether the rebuilding state in each sub-RAID metadata indicates that there exists a disk that needs to be rebuilt; if the rebuilding state in the sub-RAID metadata indicates that no disk needs to be rebuilt, recovering the data in the sub-RAID; and if the rebuilding state in the sub-RAID metadata indicates that there exists a disk that needs to be rebuilt, labeling the data in the sub-RAID as being lost. In this way, compared to the conventional RAID with data loss upon failure of two disks, the embodiments of the present disclosure may recover data in already rebuilt sub-RAIDs for users to use.

After step 203 is completed, the method 200 may end.

Hereinafter, a data rebuilding process and a data recovery process according to the embodiments of the present disclosure will be further explained in a manner of specific examples. Those skilled in the art may appreciate that the embodiments of the present disclosure are not limited to technical details in these specific examples.

Figure 8:
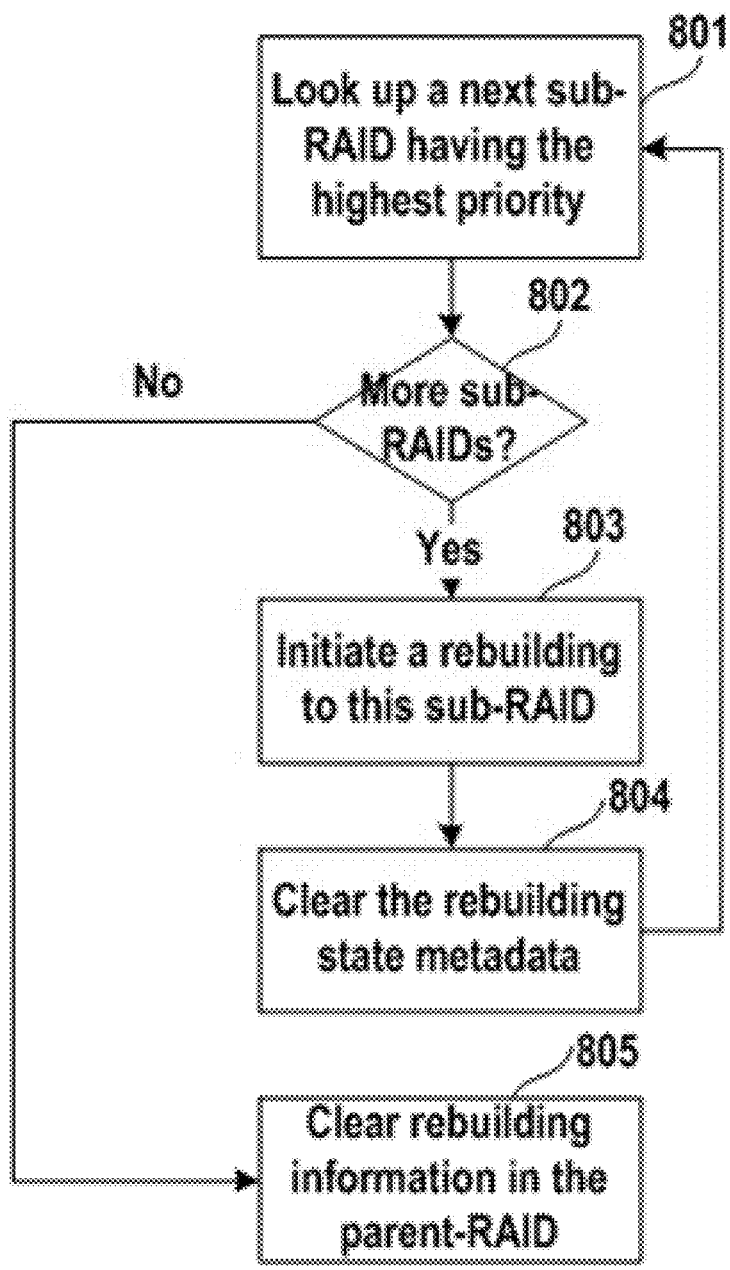
FIG. 8 schematically illustrates a flow diagram for rebuilding data according to one embodiment of the present disclosure.

FIG. 8 schematically illustrates a flow diagram for rebuilding data according to one embodiment of the present disclosure. As mentioned above, in a normal RAID, it is required to initiate rebuilding in sequence. In the embodiments of the present disclosure, a rebuilding priority is provided for each sub-RAID. In some embodiments, when a logical unit number LUN is created on a RAID, the LUN will occupy multiple sub-RAIDs. The LUN may provide a rebuilding priority and save the priority information into sub-RAID metadata. Because each sub-RAID includes rebuilding priority information, a sub-RAID with the highest priority can be selected first for rebuilding. As such, rebuilding of a certain area with more important data can be first selected.

As shown in FIG. 8, in step 801, a sub-RAID with the highest priority which needs to be rebuilt is looked up. Next, in step 802, if no sub-RAID can be found, the process may proceed to step 805. In step 805, all sub-RAIDs are rebuilt, and the rebuilding information for the parent RAID is cleared, such that the RAID is in a normal state now. On the other hand, if a next sub-RAID with the highest priority may be found in step 802, then the process may proceed to step 803. In step 803, rebuilding of respective chunks may be initiated in the sub-RAID. Next, in step 804, the rebuilding state metadata for this sub-RAID is cleared, and the process returns to step 801.

Figure 9:
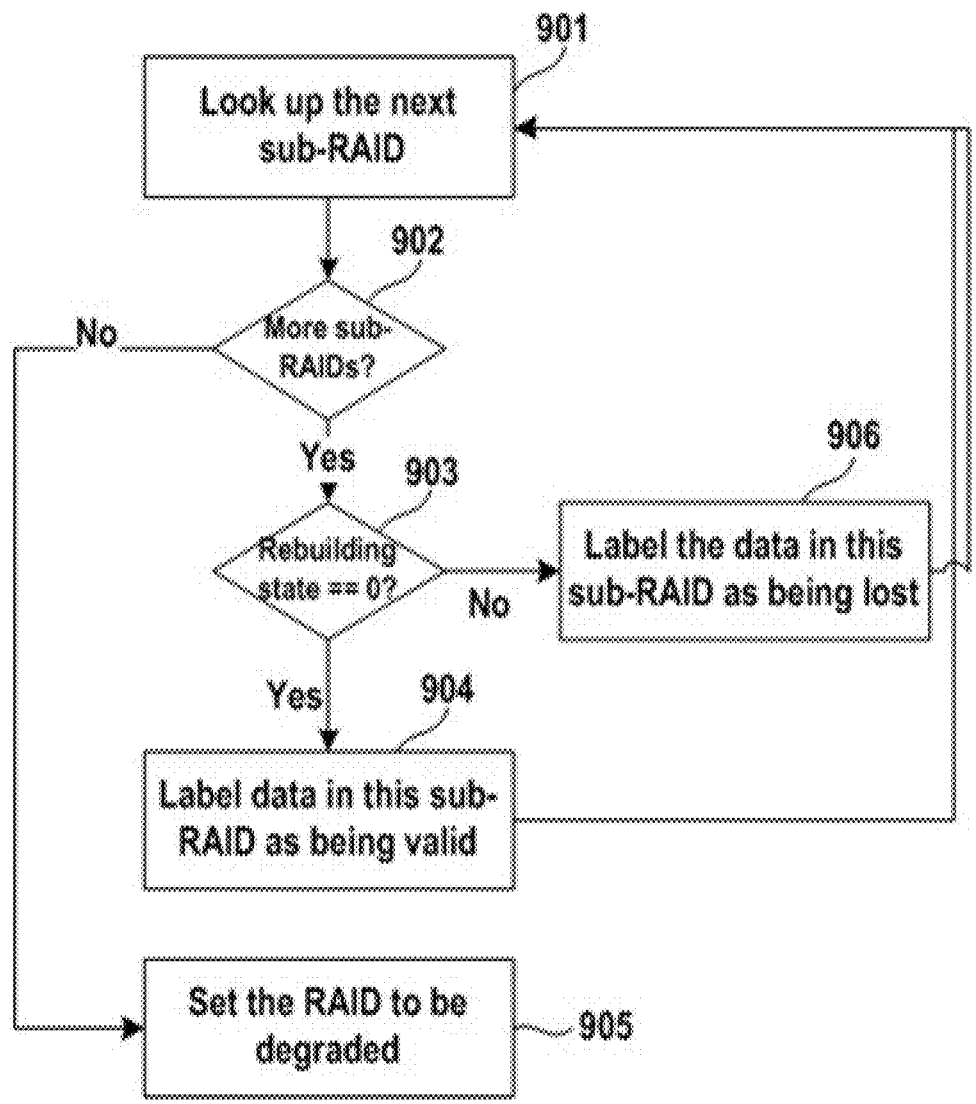
FIG. 9 schematically illustrates a flow diagram for recovering data according to one embodiment of the present disclosure.

FIG. 9 schematically illustrates a flow diagram for recovering data according to one embodiment of the present disclosure. As mentioned above, when a RAID is rebuilding while a further disk is failed, a conventional RAID will be damaged due to double disk failure. However, by virtue of the design of sub-RAID metadata, part of data may be recovered with the following process. According to some embodiments of the present disclosure, when the parent RAID is damaged, if a sub-RAID has been rebuilt, a recovery process will label the sub-RAID to be valid; and if the sub-RAID cannot be rebuilt, the sub-RAID is labeled as data loss.

Specifically, in step 901, a next sub-RAID may be looked up. Next, in step 902, if the next sub-RAID is found, a rebuilding state of metadata of this RAID may be checked in step 903. Suppose that a disk needs to be rebuilt, the bit of the rebuilding state corresponding to the disk is set to 1. In this case, if the rebuilding state is not zero, this sub-RAID cannot be recovered, because the data in the sub-RAID has not been rebuilt yet. Therefore, in step 906, all chunks in this sub-RAID are labelled as data loss; afterwards, the process may return to step 901. On the other hand, if it is determined in step 903 that the rebuilding state is zero, then the sub-RAID has been rebuilt. In this case, in step 904, all data in this RAID may be labelled as valid; afterwards, the process may return to step 901. On the other hand, in step 902, if more sub-RAIDs cannot be found, all data in the sub-RAID are checked and labeled as data loss or valid; afterwards, the RAID may be set as degraded.

According to some embodiments of the present disclosure, an interface may also be provided to users to determine whether they want to retrieve data in a damaged RAID after the recovery process above. For the part of data in the valid sub-RAIDs, there is no data loss.

Figure 10:
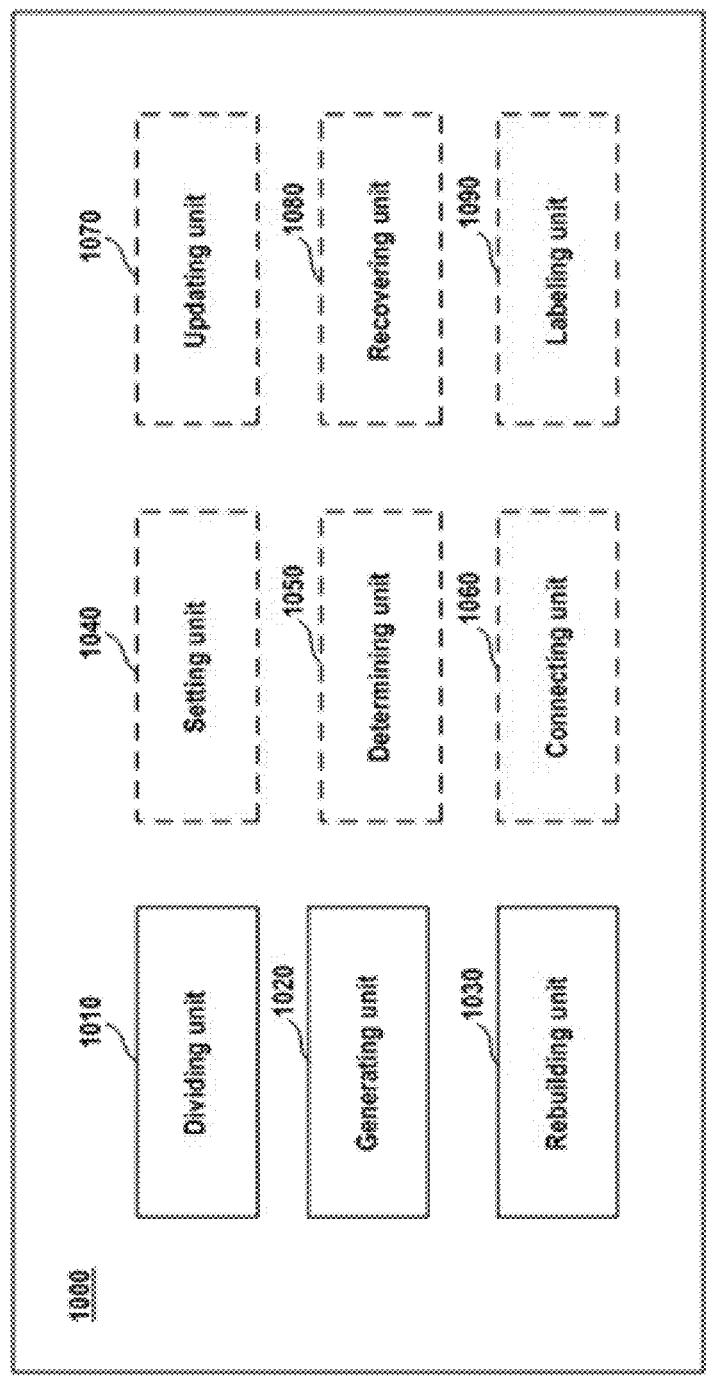
FIG. 10 schematically illustrates an apparatus for RAID according to one embodiment of the present disclosure.

FIG. 10 schematically illustrates an apparatus 1000 for RAID according to one embodiment of the present disclosure. In FIG. 10, a dotted-line block indicates that a unit is optional.

As illustrated in FIG. 10, the apparatus 1000 may include a dividing unit 1010, a generating unit 1020, and a rebuilding unit 1030. According to some embodiments of the present disclosure, the apparatus 1000 may further include a setting unit 1040, a determining unit 1050, a connecting unit 1060, an updating unit 1070, a recovering unit 1080, and a labelling unit 1090.

According to some embodiments of the present disclosure, the dividing unit 1010 may be configured to divide a RAID into a plurality of sub-RAIDs. The generating unit 1020 may be configured to generate sub-RAID metadata corresponding to each of the sub-RAIDs. The rebuilding unit 1030 may be configured to, in response to a disk in the RAID being replaced, rebuild data in a corresponding sub-RAID based on the sub-RAID metadata.

According to some embodiments of the present disclosure, the sub-RAID metadata may include a rebuilding state, and the apparatus 1000 may include a setting unit 1040. The setting unit 1040 may be configured to, in response to a disk in the RAID being replaced, set the rebuilding state to indicate that the disk needs to be rebuilt. The rebuilding unit 1030 may be further configured to rebuild the disk that needs to be rebuilt according to the indication of the rebuilding state. The setting unit 1040 may be further configured to, in response to completing the rebuilding of the disk, set the rebuilding state to indicate that the disk does not need to be rebuilt.

According to some embodiments in the present disclosure, each disk in the RAID may correspond to one bit of the rebuilding state, and the setting unit 1040 may be further configured to set a bit of the rebuilding state corresponding to the disk to indicate whether the disk needs to be rebuilt.

According to some embodiments of the present disclosure, the sub-RAID metadata may include a rebuilding priority, and the rebuilding unit 1030 may be further configured to rebuild data in the plurality of sub-RAIDs according to a priority order.

According to some embodiments of the present disclosure, the generating unit 1020 may be further configured to generate RAID metadata corresponding to the RAID.

According to some embodiments of the present disclosure, the RAID metadata may include a disk signature, the disk signature including a disk identifier uniquely identifying a disk and a RAID identifier uniquely identifying a RAID.

According to some embodiments of the present disclosure, the apparatus 1000 may further include a determining unit 1050, a connecting unit 1060, and an updating unit 1070. The determining unit 1050 may be configured to, in response to a disk in the RAID being replaced, determine whether the disk signature of a new disk exists in the RAID metadata. The connecting unit 1060 may be configured to, if it is determined that the disk signature of the new disk exists in the RAID metadata, directly connect the new disk into the RAID. The updating unit 1070 may be configured to, if it is determined that the disk signature of the new disk does not exist in the RAID metadata, update the disk signature of the new disk with the RAID identifier of the RAID, and store the updated disk signature in the RAID metadata.

According to some embodiments of the present disclosure, the RAID metadata may include the number of sub-RAIDs that need to be rebuilt and a list of the sub-RAIDs that need to be rebuilt, and the updating unit 1070 may be further configured to, in response to completing the rebuilding of data in a sub-RAID, correspondingly update the number of sub-RAIDs that need to be rebuilt and the list of the sub-RAIDs that need to be rebuilt.

According to some embodiments of the present disclosure, the determining unit 1050 may be further configured to, when the rebuilding of data in all the sub-RAIDs has not been completed and a further disk in the RAID becomes unavailable, determine whether the rebuilding state in each sub-RAID metadata indicates existence of a disk that needs to be rebuilt; and the apparatus 1000 may further include a recovering unit 1080 and a labelling unit 1090. The recovering unit 1080 may be configured to, if the rebuilding state in the sub-RAID metadata indicates that no disk needs to be rebuilt, recover data in the sub-RAID. The labeling unit 1090 may be configured to, if the rebuilding state in the sub-RAID metadata indicates existence of a disk that needs to be rebuilt, label data in the sub-RAID as being lost.

According to some embodiments of the present disclosure, the sub-RAID metadata and the RAID metadata may be stored in storage external to the RAID.

Figure 11:
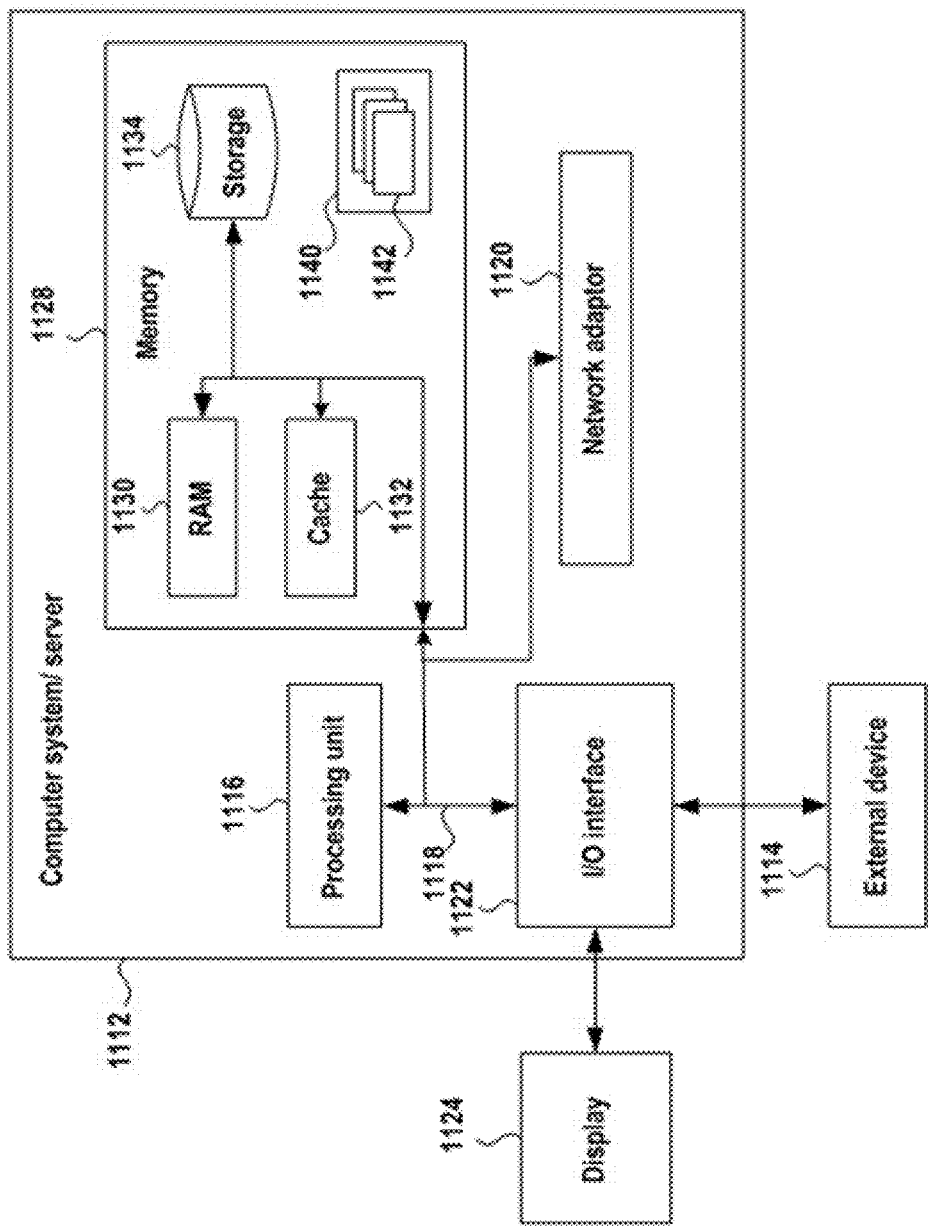
FIG. 11 schematically illustrates a block diagram of an example computer system/server that may be used to implement the embodiments of the present disclosure.

FIG. 11 schematically illustrates a block diagram of an example computer system/server 1112 that may be used to implement the embodiments of the present disclosure. It should be noted that the computer system/server 1112 as illustrated in FIG. 11 is only an example, which makes no limitation to the function and use scope of the embodiments of the present disclosure.

As shown in FIG. 11, the computer system/server 1112 is embodied in a manner of a general computing device. Components of the computer system/server 1112 may include, but not limited to, one or more processors or processing units 1116, a system memory 1128, a bus 1118 for connecting different system components (including the system memory 1128 and the processing unit 1116).

The bus 1118 indicates one or more of several bus structures, including a memory bur or a memory controller, a peripheral bus, an accelerated graphics port, a processor, or a local area bus using any bus structure in a variety of bus structures. For example, these architectures include, but not limited to, an Industry Standard Architecture (ISA) bus, a Micro Channel Architecture (MCA) bus, an enhanced ISA bus, a Video Electronics Standards Association (VESA) local area bus, and a Peripheral Component Interconnect (PCI) bus.

The computer system/server 1112 typically includes a plurality of computer system readable mediums. These mediums may be any available medium that can be accessed by the computer system/server 1112, including volatile and non-volatile mediums, mobile and immobile mediums.

The system memory 1128 may include a computer system readable medium in a form of a volatile memory, e.g., a random access memory (RAM) 1130 and/or a cache memory 1132. The computer system/server 1112 may further include other mobile/immobile, volatile/non-volatile computer system storage medium. Although not shown in FIG. 11, a disk driver for reading/writing a mobile non-volatile disk (e.g., "floppy disk") and an optical disk driver for reading/writing a mobile non-volatile optical disk (e.g., CD-ROM, DVD-ROM or other optical medium) may be provided. In these cases, each driver may be connected to the bus 1118 via one or more data medium interfaces. The memory 1128 may include at least one program product that has a set of program modules (e.g., at least one). These program modules are configured to perform functions of various embodiments of the present disclosure.

A program/utility tool 1140 having a set of program modules 1142 (at least one) may be stored in for example the memory 1128. This program module 1142 includes, but not limited to, an operating system, one or more applications, other program modules, and program data. Each or certain combination in these examples likely includes implementation of a network environment. The program module 1142 generally performs the functions and/or methods in the embodiments as described in the present disclosure.

The computer system/server 1112 may also communicate with one or more external devices 1114 (e.g., a display 1124, a storage device 1114, etc.), and may also communicate with one or devices that cause the user to interact with the computer system/server 1112, and/or communicate with any device (e.g., a network card, a modem, etc.) that causes the computer system/server 1112 to communicate with one or more other computing devices. This communication may be carried out through an input/output (I/O) interface 1122. Moreover, the computer system/server 1112 may also communicate with one or more networks (e.g., a local area network (LAN), a wide area network (WAN) and/or a public network, e.g., Internet) via a network adaptor 1120. As shown in the figure, the network adaptor 1120 communicates with other modules of the computer system/server 1112 via the bus 1118. It should be understood that although not shown in the figure, other hardware and/or software modules may be used in conjunction with the computer system/server 1112, including, but not limited to, microcode, device driver, redundancy processing unit, external disk drive array, RAID system, magnetic tape driver, and data backup storage system, etc.

In the depiction of the embodiments of the present disclosure, the term "comprise" and its similar expressions should be understood as an open inclusion, namely, "including, but not limited to." The term "based on" should be understood as "at least partially based on." The term "one embodiment" or "the embodiment" should be understood as "at least one embodiment."

It should be noted that the embodiments of the present disclosure can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above apparatus and method can be implemented with computer-executable instructions and/or control codes contained in the processor, for example, such codes provided on a bearer medium such as a programmable memory or a data bearer such as an optical signal bearer.

Although the operations of the method according to the present disclosure have been described in a specific order in the drawings, this does not require or imply that these operations must be executed in the specific order, or a desired outcome can only be achieved by executing all of the shown operations. Instead, the steps described in the flow diagrams may be executed in a different order. Additionally or alternatively, some steps may be omitted; a plurality of steps may be merged into one step to execute, and/or a step may be decomposed into a plurality of steps for execution. It should also be noted that the features and functions of two or more modules according to the present disclosure may be instantiated in one apparatus. Otherwise, the features and functions of one apparatus described above may be further partitioned into a plurality of modules to instantiate. Though the present disclosure has been described with reference to the several specific embodiments, it should be appreciated that the present disclosure is not limited the disclosed specific embodiments. The present disclosure is intended to cover various modifications and equivalent arrangements included within the spirit and scope of the appended claims.

We claim:

1. A method for a redundant array of independent disks, RAID, comprising:
    dividing the RAID into a plurality of sub-RAIDs, wherein the RAID is a parent and the plurality of sub-RAIDs are children of the parent;
    generating sub-RAID metadata corresponding to each of the sub-RAIDs, wherein metadata of the parent RAID and the sub-RAID metadata of the children are stored in separate RAID storage devices using different RAID algorithms; and
    in response to a disk in the RAID being replaced, rebuilding data in a corresponding sub-RAID based on the sub-RAID metadata.

2. The method according to claim 1, wherein the sub-RAID metadata includes a rebuilding state, the method further comprising:
    in response to a disk in the RAID being replaced, setting the rebuilding state to indicate that the disk needs to be rebuilt;
    rebuilding the disk according to the indication of the rebuilding state; and
    in response to completing the rebuilding of the disk, setting the rebuilding state to indicate that the disk does not need to be rebuilt.

3. The method according to claim 2, wherein each disk in the RAID corresponds to one bit of the rebuilding state, the method further comprising: setting a bit of the rebuilding state corresponding to the disk to indicate whether the disk needs to be rebuilt.

4. The method according to claim 1, wherein the sub-RAID metadata includes a rebuilding priority, the method further comprising: rebuilding data in the plurality of sub-RAIDs according to a priority order.

5. The method according to claim 4, further comprising: generating RAID metadata corresponding to the RAID.

6. The method according to claim 5, wherein the RAID metadata includes a disk signature, the disk signature including a disk identifier uniquely identifying a disk and a RAID identifier uniquely identifying a RAID.

7. The method according to claim 6, further comprising:
    in response to a disk in the RAID being replaced, determining whether a disk signature of a new disk exists in the RAID metadata;
    if it is determined that the disk signature of the new disk exists in the RAID metadata, directly connecting the new disk into the RAID;
    if it is determined that the disk signature of the new disk does not exist in the RAID metadata, updating the disk signature of the new disk with the RAID identifier of the RAID; and
    storing the updated disk signature in the RAID metadata.

8. The method according to claim 5, wherein the RAID metadata includes the number of sub-RAIDs that need to be rebuilt and a list of the sub-RAIDs that need to be rebuilt, the method further comprising: in response to completing the rebuilding of data in a sub-RAID, updating the number of sub-RAIDs that need to be rebuilt and the list of the sub-RAIDs that need to be rebuilt.

9. The method according to claim 5, wherein the sub-RAID metadata and the RAID metadata are stored in storage external to the RAID.

10. The method according to claim 1, further comprising:
    when rebuilding of data in all the sub-RAIDs has not been completed and at least one disk in the RAID becomes unavailable, determining whether a rebuilding state in the sub-RAID metadata indicates existence of a disk that needs to be rebuilt;
    if the rebuilding state in the sub-RAID metadata indicates that no disk needs to be rebuilt, recovering data in the sub-RAID; and
    if the rebuilding state in the sub-RAID metadata indicates existence of a disk that needs to be rebuilt, labeling data in the sub-RAID as being lost.

11. An apparatus for a redundant array of independent disks (RAID), including one or more processors and one or more memories configured to perform operations, comprising:
    dividing the RAID into a plurality of sub-RAIDs, wherein the RAID is a parent and the plurality of sub-RAIDs are children of the parent;
    generating sub-RAID metadata corresponding to each of the sub-RAIDs, wherein metadata of the parent RAID and the sub-RAID metadata of the children are stored in separate RAID storage devices using different RAID algorithms; and
    rebuilding, in response to a disk in the RAID being replaced, data in a corresponding sub-RAID based on the sub-RAID metadata.

12. The apparatus according to claim 11, wherein the sub-RAID metadata includes a rebuilding state, the operations further comprising:
    setting, in response to a disk in the RAID being replaced, the rebuilding state to indicate that the disk needs to be rebuilt;
    wherein the disk that needs to be rebuilt is rebuilt according to the indication of the rebuilding state; and
    in response to completing the rebuilding of the disk, setting the rebuilding state to indicate that the disk does not need to be rebuilt.

13. The apparatus according to claim 12, wherein each disk in the RAID corresponds to one bit of the rebuilding state and wherein the operations further comprise setting a bit of the rebuilding state corresponding to the disk to indicate whether the disk needs to be rebuilt.

14. The apparatus according to claim 11, wherein the sub-RAID metadata includes a rebuilding priority and wherein the operations further comprise rebuilding data in the plurality of sub-RAIDs according to a priority order.

15. The apparatus according to claim 14, wherein the operations further comprise generating RAID metadata corresponding to the RAID.

16. The apparatus according to claim 15, wherein the RAID metadata includes a disk signature, the disk signature including a disk identifier uniquely identifying a disk and a RAID identifier uniquely identifying a RAID.

17. The apparatus according to claim 16, wherein the operations further comprise:
   determining, in response to a disk in the RAID being replaced, whether a disk signature of a new disk exists in the RAID metadata;
   connecting, if it is determined that the disk signature of the new disk exists in the RAID metadata, directly the new disk into the RAID; and
   updating, if it is determined that the disk signature of the new disk does not exist in the RAID metadata, the disk signature of the new disk with the RAID identifier of the RAID, and storing the updated disk signature in the RAID metadata.

18. The apparatus according to claim 15, wherein the RAID metadata includes the number of sub-RAIDs that need to be rebuilt and a list of the sub-RAIDs that need to be rebuilt, and wherein the operations further comprise updating, in response to completing the rebuilding of data in a sub-RAID, the number of sub-RAIDs that need to be rebuilt and the list of the sub-RAIDs that need to the rebuilt.

19. The apparatus according to claim 15, wherein the sub-RAID metadata and the RAID metadata are stored in storage external to the RAID.

20. The apparatus according to claim 11, wherein the operations further comprise determining, when rebuilding of data in all the sub-RAIDs has not been completed and at least one disk in the RAID becomes unavailable, whether a rebuilding state in the sub-RAID metadata indicates existence of a disk that needs to be rebuilt; the operations further comprising:
   recovering, if the rebuilding state in the sub-RAID metadata indicates that no disk needs to be rebuilt, data in the sub-RAID; and
   labeling, if the rebuilding state in the sub-RAID metadata indicates existence of a disk that needs to be rebuilt, data in the sub-RAID as being lost.

* * * * *